United States Patent [19]

Berry et al.

[11] Patent Number: 5,163,162
[45] Date of Patent: Nov. 10, 1992

[54] SYSTEM AND METHOD FOR DATA RECOVERY IN MULTIPLE HEAD ASSEMBLY STORAGE DEVICES

[75] Inventors: Robert L. Berry, Johnson City; Brandt C. Centerwall, Chenango Forks, both of N.Y.; Stephen G. Luning, San Jose, Calif.; Forrest L. Wade, Tucson, Ariz.

[73] Assignee: IBM Corporation, Armonk, N.Y.

[21] Appl. No.: 612,661

[22] Filed: Nov. 14, 1990

[51] Int. Cl.⁵ .............................. G11B 7/12
[52] U.S. Cl. .................... 369/43; 360/76; 360/77.02; 360/77.06; 371/1; 371/40.2
[58] Field of Search .................. 371/1, 40.1, 40.2; 360/22, 76, 77.06, 77.02, 77.01, 77.05, 77.12, 77.13; 369/43, 44.37, 44.38

[56] References Cited

U.S. PATENT DOCUMENTS

| | | | |
|---|---|---|---|
| Re. 31,166 | 3/1983 | Korda | 360/53 |
| 3,943,566 | 3/1976 | Brock et al. | 360/71 |
| 4,024,498 | 5/1977 | McIntosh | 371/1 |
| 4,092,732 | 5/1978 | Ouchi | 364/900 |
| 4,103,234 | 7/1978 | Frazier, Jr. | 341/139 |
| 4,148,082 | 4/1979 | Okada et al. | 360/77.01 |
| 4,414,587 | 11/1983 | Weaver et al. | 360/76 |
| 4,445,145 | 4/1984 | Moriya | 360/77.01 |
| 4,445,153 | 4/1984 | Fujimoto et al. | 360/77.06 |
| 4,477,849 | 10/1984 | Berger | 360/77.05 |
| 4,516,165 | 5/1985 | Cunningham et al. | 360/53 |
| 4,549,234 | 10/1985 | Sakamoto | 360/10.2 |
| 4,581,567 | 4/1986 | Yanagawa et al. | 360/77.02 |
| 4,604,687 | 8/1986 | Abbott | 364/200 |
| 4,620,244 | 10/1986 | Krause | 360/77.02 |
| 4,669,004 | 5/1987 | Moon et al. | 360/77.01 |
| 4,722,085 | 1/1988 | Flora et al. | 364/200 |
| 4,726,028 | 2/1988 | Himeno | 371/37.1 |
| 4,730,321 | 3/1988 | Machado | 371/40.1 |
| 4,783,705 | 11/1988 | Moon et al. | 360/76 |
| 4,817,035 | 3/1989 | Timsit | 364/900 |
| 4,823,212 | 4/1989 | Knowles et al. | 360/77.08 |
| 4,825,403 | 4/1989 | Gershenson et al. | 364/900 |
| 4,831,609 | 5/1989 | Suzuki | |
| 4,914,656 | 4/1990 | Dunphy, Jr. et al. | 371/10.2 |
| 4,942,579 | 7/1990 | Goodlander | 371/10.1 |

Primary Examiner—Robert Weinhardt
Assistant Examiner—Jennifer L. Hazard
Attorney, Agent, or Firm—Sterne, Kessler, Goldstein & Fox

[57] ABSTRACT

A systematic method for detecting which head in a multiple head storage device contains errors and may be misaligned, and correcting for misalignment so that the data can be recovered. The apparatus includes a data buffer for storing a block of interleaved data read from the multiple head storage device, status bits, error detection circuitry for determining from the interleaved data, which if any of the heads is misaligned and for setting the status bits, data recovery control logic responsive to the status bits for sending control signals to the multiple head storage device for causing the misaligned head to move its position by small increments and to read data until the status bits indicate that the misaligned head has become aligned, and circuitry responsive to the status bits for writing data from the newly realigned head over the data which was read when that head was misaligned. The method includes steps of reading a block of interleaved data from a multiple head storage device and sending that data to a data buffer; detecting the existence of a misaligned head in determining which head is misaligned; generating error detection signals which indicate which head is misaligned; setting status bits in response to the error detection signals and sending control signals to the multiple head storage device to move the misaligned head by small increments and to read data from the misaligned head. The steps are repeated until the status bits indicate that the misaligned head has become realigned. After the head has become realigned the data which was stored in the storage buffer when the head was misaligned is written over by data read from the newly aligned head.

33 Claims, 9 Drawing Sheets

SYSTEM AND METHOD FOR DATA RECOVERY IN MULTIPLE HEAD ASSEMBLY STORAGE DEVICES

BACKGROUND OF THE INVENTION

I. Field of the Invention

The present invention is a system and method for detecting and correcting errors in a multiple head storage device. More specifically, this invention relates to a system and method for detecting errors caused by the misalignment of one or more heads in a multiple head storage device, and for manipulating these heads in order to recover undecipherable data caused by the misalignment.

II. Related Art

In recent years, there has been an enormous increase in the speed and general capabilities of computers. This has been driven largely by the desires of people to solve larger and more complex problems. In view of the size of some of these problems and the amounts of raw data that they require, the speed and power of computer peripherals such as mass-storage devices is very important in order to take full advantage of a powerful computer.

The speed of mass-storage devices has traditionally lagged significantly behind the speed of state-of-the-art computers. This is largely due to the fact that, unlike the computational portion of a computer, mass-storage devices contain moving parts. Consequently, there is a continuing need for faster data storage devices which can effectively work in conjunction with today's high speed computers.

At present, computer storage devices for storing data used in conjunction with the computational portion (also referred to as the "host" portion) of a computer typically have one or more read/write or read-only heads which pass over some medium upon which data is stored. The storage capabilities of these mediums are usually based upon magnetic or optical principles. The faster devices using such mediums are typically in the form of magnetic or optical disks.

In most cases, the heads and their associated controlling mechanisms are configured so that each head will only read from and write to certain portions of a storage medium. These portions are known as tracks. On a magnetic or optical disk storage device, these tracks are concentric, having some amount of concentric non-used space between each track. When a host device or host computer requests that certain data residing on one or more tracks be sent to it, the head is then manipulated over those desired tracks in order to read the desired data.

The number and spacing of these tracks used with the above-noted storage mediums are generally dictated by some combination of hardware and software which directly or indirectly controls the heads. The width of the track itself, however, is a function of the head. In any event, it is important that a head be able to position itself properly over the track which it is directed to (the "target" track) in order to accurately read data. This has become more difficult due to the increased need to store and retrieve more data more quickly without increasing the size of the storage medium. The result is the development of storage devices in which data is packed more densely, and in which the medium is passed under the heads more quickly.

At any given point in time, the limitations of technology allow data to be packed only so densely and heads to read data only so quickly. In addition, those storage devices which are state-of-the-art in terms of data density and the speed at which the medium is passed under the heads tend to be expensive. Thus, in order to increase the speed (that is, the throughput) at which a host computer can write data to or receive data from a single storage device, storage devices having multiple heads were developed. The type of multiple head storage device contemplated here is one where all of the heads in the device are reading data simultaneously, or are writing data simultaneously.

Typically, when data is sent to one of these multiple head storage devices from a host computer, it is distributed or "striped" into sections evenly amongst the heads of the storage device. For example, in a three-head storage device, the data might be split up so that first two bytes might go to head 1, the next two to head 2, the next two to head 3, and then the next two to head 1 again. In this example, each section is two bytes. During this process, each head is positioned over a different track (each track may or may not reside on a different storage medium, as will be explained regarding FIGS. 1 and 2 below). This striping operation continues until all of the data sent by the host computer has been written to the storage device.

When the host computer requests that data be read to it from such a three-head storage device, all of the heads simultaneously read the data and combine or "interleave" it back again so that it is in the same form as when the host computer initially sent it to the storage device. Thus, as far as the host computer is concerned, the multiple head storage device uses only one head.

A problem that occurs in storage devices generally is that the head sometimes becomes misaligned with a track. This misalignment causes the head to read useless or "undecipherable" data. One method for realigning the head is to move the head back and forth by small increments until the head is again aligned with the track so that the data from that track becomes decipherable, and can be recovered. Thus, the head is moved in increments sufficiently small and in such a pattern so that it can seek out the target track without wandering too far from the target track (or too close to another track). Depending upon the condition of the storage device, the device will continue to be used, or else the data will be recovered, and the device replaced.

In a multiple head storage device, the problem of misalignment is amplified by the fact that there is more than one head to consider. In order to minimize this problem, the heads of multiple head storage devices are typically locked together as a multiple head assembly so that they all move in unison. In this way, misalignments usually affect all of the heads, and thus corrective measures can be taken as though there was only a single head to consider.

Even in multiple head storage devices where the heads are locked together in a multiple head assembly, one or more of the heads in the multiple head assembly can nevertheless become misaligned. When this occurs, it is necessary to recover the data from those tracks serviced by the misaligned head(s). However, the recovery process involved is more difficult than if the storage device had only a single head.

FIG. 1 is used to illustrate the problems with error detection and data recovery that can occur in a multiple head storage device described above. Referring to FIG.

1, this figure shows an example of a multiple head storage device 104 having three separate disks, with one head servicing each disk. In this example, the heads are attached together to form a multiple head assembly 106 which constrains all of the heads to move in unison.

Although the heads in the example shown in FIG. 1 may be initially set at the proper distances for them to read or write properly on their designated tracks, it is still possible for one or more of the heads to become misaligned. In this example, head 3 is shown to be misaligned.

One problem with determining which head is misaligned and is causing undecipherable data to be generated is that error detection and correction schemes generate some type of Error Correction Code (ECC) prior to storing data to the multiple head storage device 104. Thus, each ECC is a function of some amount of the pre-striped data. When there is a request from the host computer to read data from the multiple head storage device 104, the multiple head storage device 104 interleaves the data, and the ECC is checked to make sure that the data read is the same data that was written to the multiple head storage device (that is, that there are no data errors). Since the ECC is conventionally used to check some amount of pre-striped data (that is, it is used to check the data after it is interleaved), it would be difficult to determine from an error detected from the occurrence of undecipherable data specifically which head caused the error.

Another problem is that by moving head 3 in multiple head storage device 104 by a small increment to correct the misalignment of head 3, this will typically cause heads 1 and 2 to become misaligned. This would cause any data read from heads 1 and 2 to become undecipherable. Thus, the data from these other heads must be taken care of either before or after the multiple assembly 106 is moved by small increments, since data from all heads need to be interleaved before the data can be sent to a host computer 102. Where at least one head is misaligned, the fact that all the heads cannot simultaneously read decipherable data makes this interleave process more difficult.

FIG. 2 shows another example of a multiple head storage device. This type of multiple head storage device utilizes more than one head per disk. The example shown in FIG. 2 shows such a multiple head storage device 104 having three heads and n tracks, where n would typically be an integer divisible by 3.

Thus, what is needed is a system or method to identify which head(s) in a multiple head storage device is misaligned, and to recover the data from that device in an efficient manner.

SUMMARY OF THE INVENTION

The present invention overcomes the deficiencies of the related art noted above by providing a system and method for detecting and correcting misaligned heads in a multiple head storage device.

In implementing this system and method, an embodiment of the present invention first analyzes a block of interleaved data received from a multiple head storage device, and determines if there are any errors (that is, undecipherable data) indicating a misalignment of one or more of the heads of the multiple head storage device. In addition, if an error is detected, the present invention determines which head is misaligned.

After a determination has been made regarding whether any misaligned heads exist, the block of interleaved data is sent to a data buffer, and error detection signals are sent to status bits. The status bits are used as flags to indicate whether any misaligned heads exist, and which head(s) is misaligned.

Data recovery control logic analyzes the status bits to check if any misaligned heads exist. If there are none, then the block of interleaved data in the data buffer can be sent to a host computer, rewritten to the multiple head storage device, or sent to some other device.

If, however, the status bits indicate that an error has occurred, the data recovery control logic sends control signals to the multiple head storage device indicating that the multiple head storage device should move the misaligned head by small increments and send data from the misaligned head to the present invention. This continues to occur until the status bits indicate that no error is detected (that is, the misaligned head has become aligned, and the data from the head has become decipherable).

Once the misaligned head has been aligned, the data read from the aligned head is interleaved with the block of interleaved data in the data buffer. This is done so that the portion of the interleaved block of data which had been read from the misaligned head is replaced with data read from the aligned head. This data can then be sent to any of the devices noted above.

Thus, the present invention can detect the existence of a misaligned head from a block of interleaved data read from a multiple head storage device, and also realign the head and recover decipherable data before the block of interleaved data is sent to the host computer.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION OF THE PREFERRED EMBODIMENTS

I. Overview

The present invention is a system and method for detecting and correcting errors in a multiple head storage device. More specifically, the present invention relates to a system and method for error detection and data recovery in a multiple head storage device where one or more of the heads can become misaligned. This is done by detecting which head(s) is misaligned with its target track(s), buffering the data read from the head(s) which was not misaligned, incrementally moving the misaligned head(s) until it becomes aligned with its target track(s) so that it can read decipherable data, and interleaving the decipherable data from the aligned head(s) into the buffered data so as to produce a block of data for, for example, the host computer.

In general, the present invention detects errors (that is, undecipherable data) in blocks of interleaved data caused by the misalignment of one or more heads in a multiple head storage device, and recovers the data from the target tracks of these heads. The recovered data is typically sent to the host computer. Once the data is recovered, the multiple head storage device can then be replaced, and the data can be written to a new multiple head storage device.

Alternatively, the data received by the host computer can be rewritten to the original multiple head storage device, since the data will be written to the locations of the storage medium corresponding to the positions of the heads. In other words, when data is rewritten to a misaligned head whose position has moved from its original position by some amount, the position of the rewritten target track will have moved from the position of the original track by a corresponding amount. Thus, as long as a misaligned head does not move its position once the data is rewritten, the data can be read in a normal fashion.

Additionally, it should be noted that the present invention contemplates that the block of interleaved data can be rewritten to the original multiple head storage device without first sending the data to the host computer.

Figure 3:
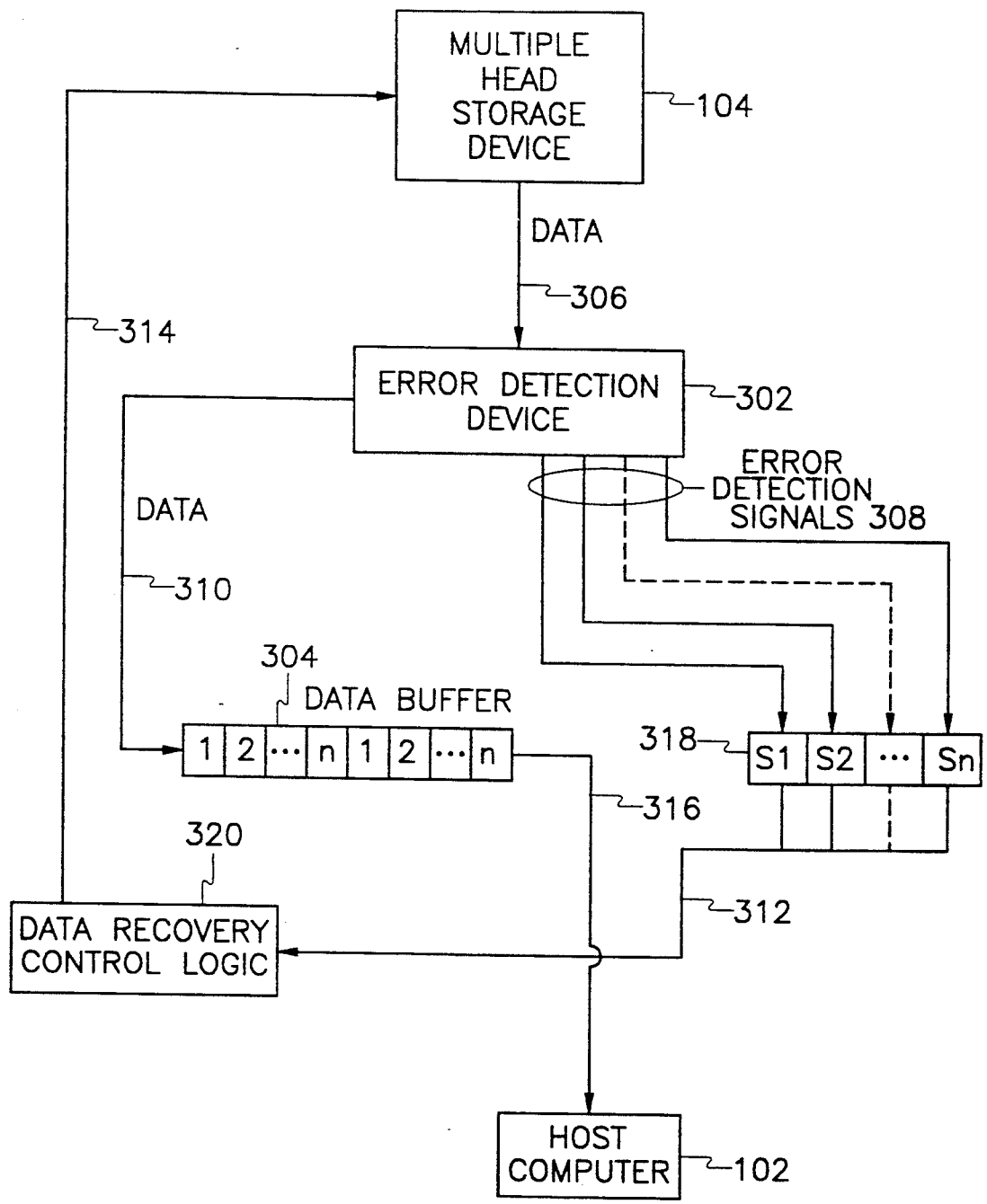
FIG. 3 is a high-level block diagram of an embodiment of the present invention.

A broad concept of the present invention can best be described with regard to FIG. 3. The embodiment shown in FIG. 3, as well as others contemplated by the present invention, utilizes a multiple head storage device 104 having two or more heads for reading data or writing data simultaneously. It is further contemplated that the multiple head storage device 104 automatically splits up (stripes) data into sections when data is sent to it from a host device such as a host computer 102. Conversely, when data is read from the multiple head storage device 104, it is contemplated that the multiple head storage device 104 interleaves the data back into the same form in which it was originally sent by the host computer 102.

Figure 1:
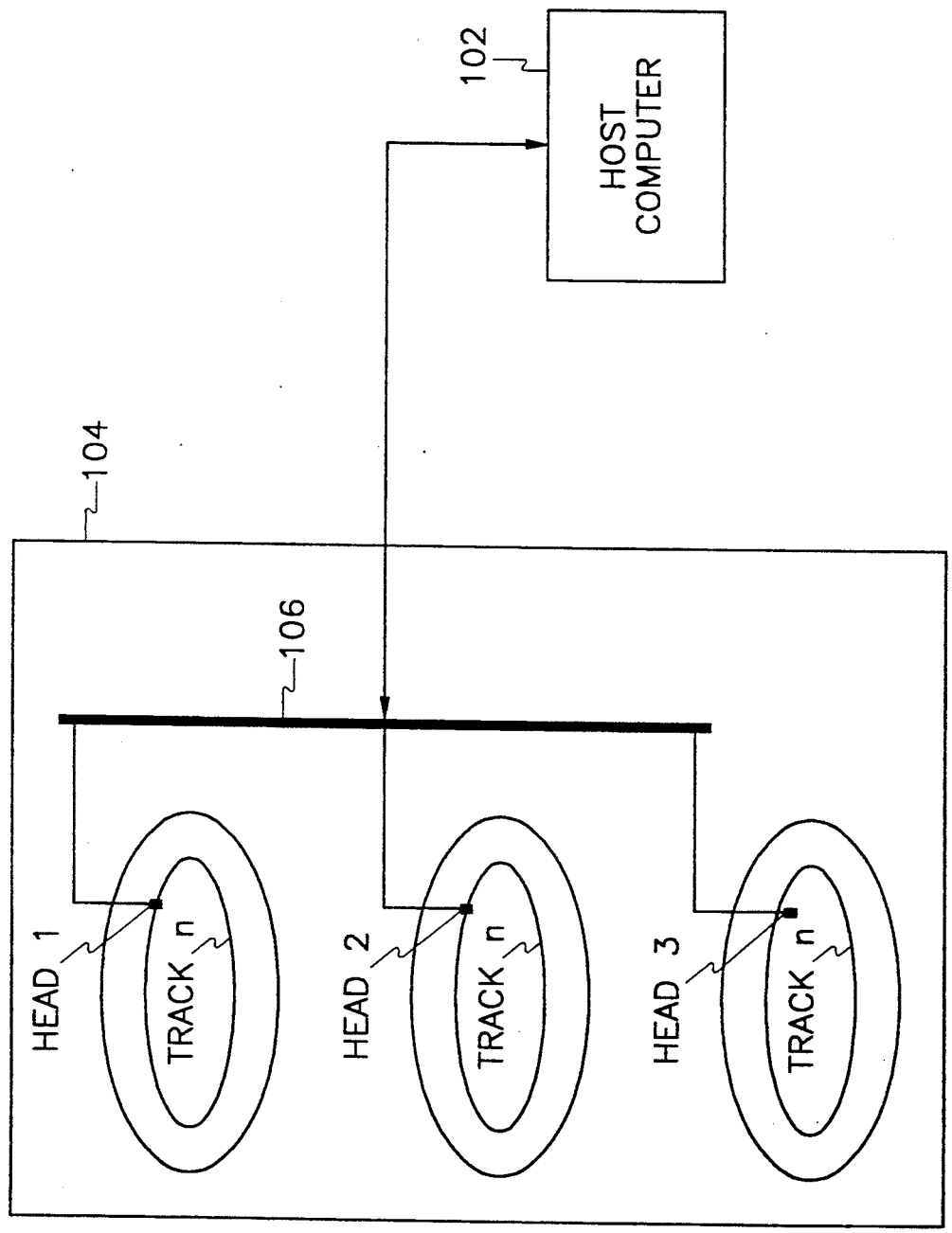
FIG. 1 is a block diagram of a multiple head storage device having 3 disks and one head for each disk, where head 3 is shown to be misaligned.
Figure 2:
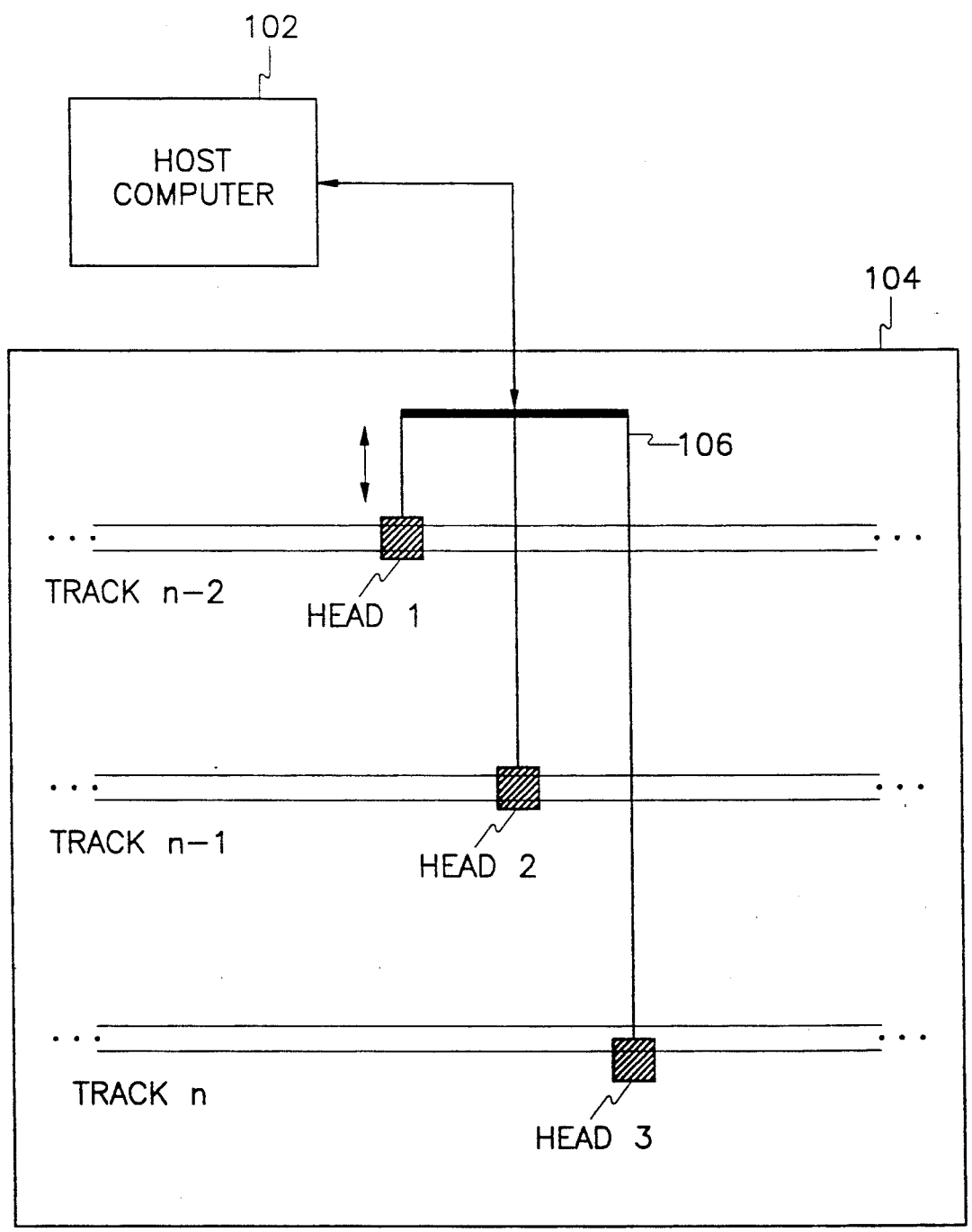
FIG. 2 is a top view of a multiple head storage device having a plurality of tracks and three heads, where head 3 is shown to be misaligned.

Examples of the type of multiple head storage devices 104 contemplated above are those shown in FIGS. 1 and 2. A more specific example of such a multiple head storage device 104 is a 3370 multiple disk DASD from IBM Corporation of Armonk, N.Y. It should be understood, however, that the present invention also contemplates operation with multiple head storage devices 104 which do not stripe and interleave data automatically.

During the normal course of reading a block of interleaved data from multiple head storage device 104, the present invention accepts a block of interleaved data sent along data line 306 to an error detection device 302 for detecting errors in the data caused by a misalignment of one or more heads. Regardless of whether any errors are detected by error detection device 302, this block of interleaved data is automatically sent via data line 310 to data buffer 304. In one embodiment of the present invention, this block of data is, for example, 4 Kilobytes in size, although any convenient size can be used.

Data buffer 304 is broken up in FIG. 3 for illustrative purposes into sections to indicate which of the heads from multiple head storage device 104 read that particular section of data. For example, those sections of data buffer 304 containing a 1 represent data which had been read from head 1. Similarly, a 2 represents the data read from head 2. When the $n^{th}$ section of data has been read from head n, the sequence begins anew. In effect, data buffer 304 shows the source of each section of the block of interleaved data with regard to which head read the data.

After the data is sent to data buffer 304 via data line 310, error detection signals 308 are sent from error detection device 302 to status bits 318. These status bits 318 are used as a flagging mechanism to indicate which heads of the multiple head storage device 104 are misaligned. If the status bits 318 indicate that no heads are misaligned, then the data in data buffer 304 can be sent to the host computer 102 via data line 316.

If the status bits indicate that one or more heads are misaligned, the block of interleaved data received from multiple head storage device 104 is still sent to the data buffer 304. In addition, however, the status bits 318 will indicate which heads are misaligned. For example, if an error has been detected in head 2 of multiple head storage device 104, then the error detection device 302 will send a signal to status bit S2 of status bits 318, and set that bit to indicate that head 2 is misaligned.

To continue the example of head 2 being misaligned (for purposes of illustration), if head 2 is misaligned and status bit S2 has been set to indicate this event, then the block of interleaved data stored in data buffer 304 will not be sent to host computer 102. This is because the data which was read from head 2 is undecipherable, and decipherable data from head 2 must first be recovered. Since the data read into the data buffer 304 from the other heads is decipherable, the present invention will preserve this decipherable data in the data buffer 304 so that it can interleave the recovered data from head 2 with the decipherable data.

In order to recover undecipherable data resulting from a misalignment, data recovery control logic 320 is responsive to the status bits 318 when the status bits 318 indicate that a head is misaligned. This indication is sent via control line 312. Thus, the fact that status bit S2 is set informs the data recovery control logic 320 that head 2 is misaligned.

Upon receipt of an indication from the status bits 318 that head 2 is misaligned, the error recovery control logic 320 sends control signals to the multiple head storage device 104 via control line 314, causing multiple head assembly 106 (see FIGS. 1 and 2) to move traversely to the length of the target track by some small increment In one embodiment, all of the heads of the multiple head storage device 104 read data, and the multiple head storage device 104 sends a new block of interleaved data to the error detection device 302 via data line 306.

Status bit S2 is then checked by the data recovery control logic 320 to determine if the data read from head 2 of multiple head storage device 104 is still undecipherable. If the data is still undecipherable, then the data recovery control logic 320 will again cause multiple head assembly 106 to move by a small increment, and another block of interleaved data will be sent to the error detection device 302.

This data recovery cycle will repeat itself until status bit S2 of status bits 318 indicates that the data from head 2 is decipherable, thus indicating the alignment of head 2. At that point, the decipherable data from head 2 is interleaved into its proper locations in the block of interleaved data within the data buffer 316. In this example, those sections of the data buffer 316 marked with a 2 will be over-written by the decipherable data read from the now-aligned head 2. The present invention contemplates that this interleaving can be controlled by the data recovery control logic 320, or it can be controlled by some separate interleaving means. In any event, it should be noted that since the incremental movement of the multiple head assembly 106 will cause those heads which were previously aligned to read undecipherable data, any undecipherable data read during the data recovery cycle which would corrupt any decipherable data already read into the data buffer 304 is not permitted to overwrite the decipherable data in the data buffer 304.

Once this interleaving is complete, the data in data buffer 304 can be sent as a block to host computer 102. If more than one head is misaligned, then the data recovery cycle is repeated for as many heads as are out of alignment before the data in data buffer 304 is sent to host computer 102.

Although the explanation given above contemplated a multiple head storage device 104 with a multiple head assembly 106 where all the heads are attached to a multiple head assembly 106 and thus all move in unison, it should be understood that the present invention also contemplates a multiple head storage device 104 in which each of the heads can be controlled individually. In such a situation, the data recovery control logic 320 would only manipulate those heads which were found to be misaligned.

It should also be understood that the present invention contemplates usage with multiple head storage devices 104 in which peripheral devices are necessary for the striping and interleaving operations. In addition, while one embodiment of the present invention contemplates that the present invention exist as an intermediate device between the multiple head storage device 104 and the host computer 102, the present invention can also be integrated into a multiple head storage device 104 having improved error detection and data recovery. Further, the present invention contemplates usage with various types of read/write and read-only disk storage devices, including magnetic and optical disks.

It should also be understood that the present invention contemplates using a data buffer 304 and corresponding status bits 318 which are large enough to hold multiple blocks of interleaved data, and thus allow more than one block of interleaved data to be read from the multiple head storage device 104 at one time. In this way, more than one consecutive block of interleaved data can be checked for errors and sent to the host computer 102 at a time.

II. Dual Buffer Embodiment

Figure 4:
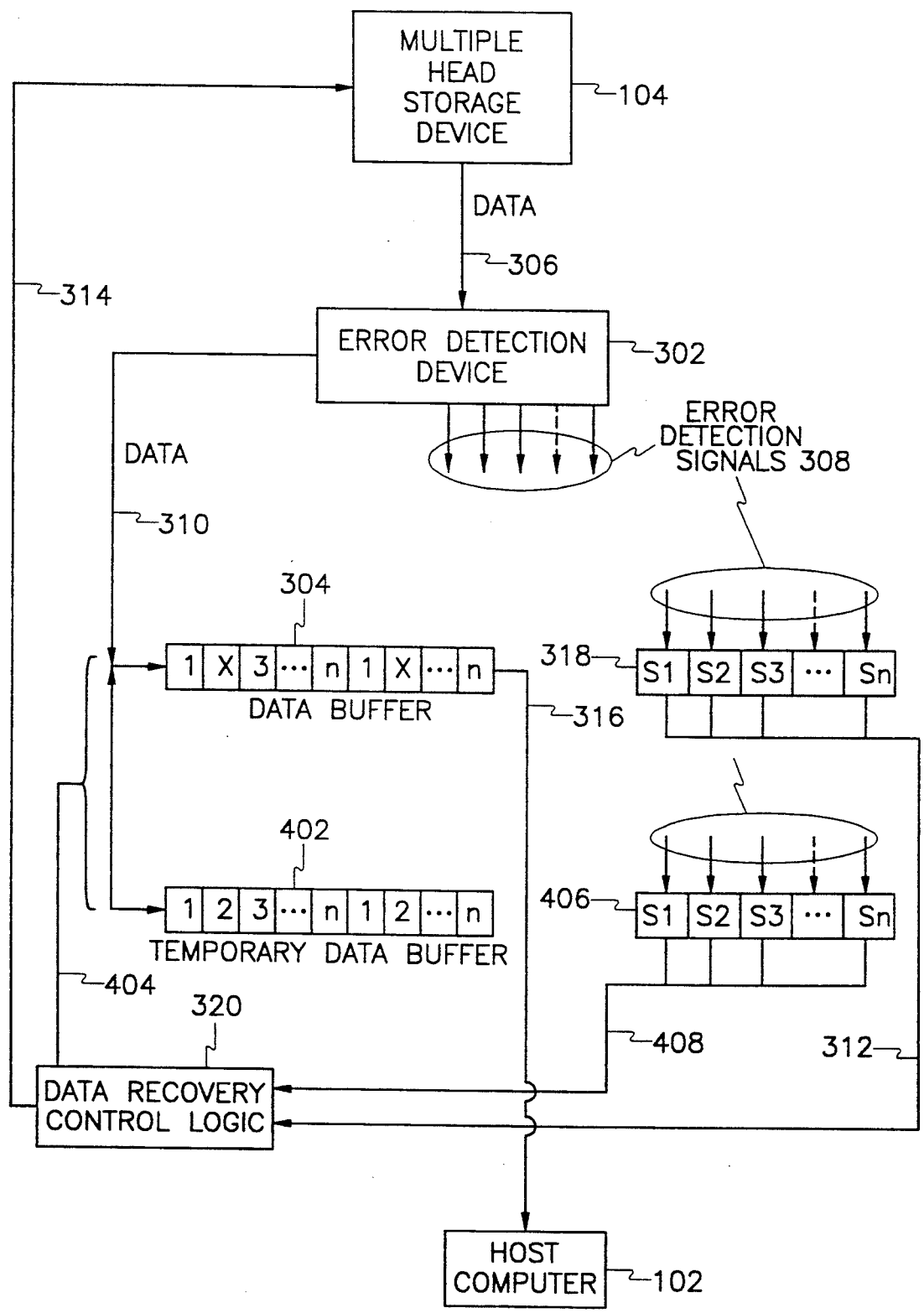
FIG. 4 is a block diagram of an embodiment of the present invention with a temporary data buffer.

FIG. 4 shows a specific implementation of the present invention using a dual-buffer approach in order to accomplish the above-noted objectives of recovering data from a misaligned head in a multiple head storage device. FIG. 4 is best explained by example, again using the example where head 2 of multiple head storage device 104 is misaligned.

Referring now to FIG. 4, the X's in sections of data buffer 304 indicate that the data read into data buffer 304 from head 2 is undecipherable. As before with regard to FIG. 3, status bit S2 of status bits 318 is set to indicate that head 2 is misaligned. The set status bit S2 is detected by data recovery control logic 320, which then causes at least head 2 to move by small increments in an effort to re-align head 2 over its target track(s), and recover the data from that track(s).

As indicated above, where all the heads are attached together by a multiple head assembly 106, then the movement of a misaligned head such as head 2 will typically cause the remaining heads to become misaligned. If all the data read from the multiple head assembly 106 were read into the data buffer 304 during the data recovery sequence noted above, then the good, decipherable data which was read in previously by those remaining heads could become corrupted.

One solution of the present invention for overcoming this problem is to permit only data read by the misaligned head (in this case, head 2) to be read into the data buffer 304. Implementation of this approach entails extracting only those sections from the interleaved data of data line 310 read from head 2. Then, the data from head 2 is interleaved into its appropriate locations (in this example, the locations marked with an X) within the data buffer 304. The extraction and interleaving would need to be implemented for each read from the multiple head storage device 104 during the recovery process, and thus would continue until status bits 318 indicated that head 2 was aligned.

Another embodiment as shown in FIG. 4 includes the use of temporary status bits 406, and a temporary data buffer 402 into which a block of interleaved data is read when status bits 318 indicate that one or more heads of the multiple head storage device 104 are misaligned. Thus, blocks of interleaved data are read into the temporary data buffer 402 only after the data recovery cycle outlined above has begun. In addition, once this cycle has begun, error detection signals 308 are sent to the temporary status bits 406. The data recovery control logic 320 then checks the temporary status bits 406 rather than the status bits 318 to determine whether a misaligned head has become an aligned head.

When the temporary status bits 406 indicate that head 2 is aligned, and thus that the data read into the temporary data buffer 402 from head 2 is decipherable, the data recovery control logic 320 sends control signals via control line 404 to interleave the data read into the temporary data buffer 402 from aligned head 2 to the appropriate sections (in FIG. 4, marked by an X) of the data buffer 304. This causes the undecipherable data in the data buffer 304, which was previously read by head 2, to consequently be overwritten. The other data that was read into the temporary data buffer 402 during the data recovery cycle is ignored.

When the interleaving of data from aligned head 2 is completed, the entire block of interleaved data in data buffer 304 is decipherable. This block of interleaved data can the be sent to the host computer 102.

An advantage of using the temporary data buffer 402 as described above is that it allows data to be read directly into a the temporary data buffer 402 during the data recovery process. This is in contrast to having to carefully separate the data read from the misaligned head from the rest of the block of interleaved data before interleaving it into data buffer 304 each time a block of interleaved data is sent from the multiple head storage device 104 during a data recovery cycle.

Another advantage is that the use of the temporary data buffer allows the present invention to simply replace the undecipherable data in the data buffer 304 with decipherable data in the temporary data buffer 402, rather than request that the multiple storage device 104 again read data once the temporary status bits 406 indicate that the misaligned head has become aligned. In other words, if the data which is passed through the error detection device 302 is not stored somewhere, then when the error detection device 302 finally indicates that the head is now aligned, the multiple head storage device 104 would have to again read the data from the now-aligned head.

The above-noted description regarding temporary data buffer 402 indicates that data from all the heads (that is, the entire block of interleaved data) is read into the temporary data buffer 402, even though only that data from the misaligned head is scrutinized during the data recovery cycle. However, it should be understood that the present invention also contemplates an embodiment where temporary data buffer 402 permits only data from a misaligned head to be read in.

In general, the embodiments shown by FIG. 4 allow for an efficient way to recover data and improve the integrity of the block of interleaved data in the data buffer 304 before it is sent to a device such as the host computer 102.

III. Enhanced Dual Buffer With Improved Error Detection Design

Figure 5:
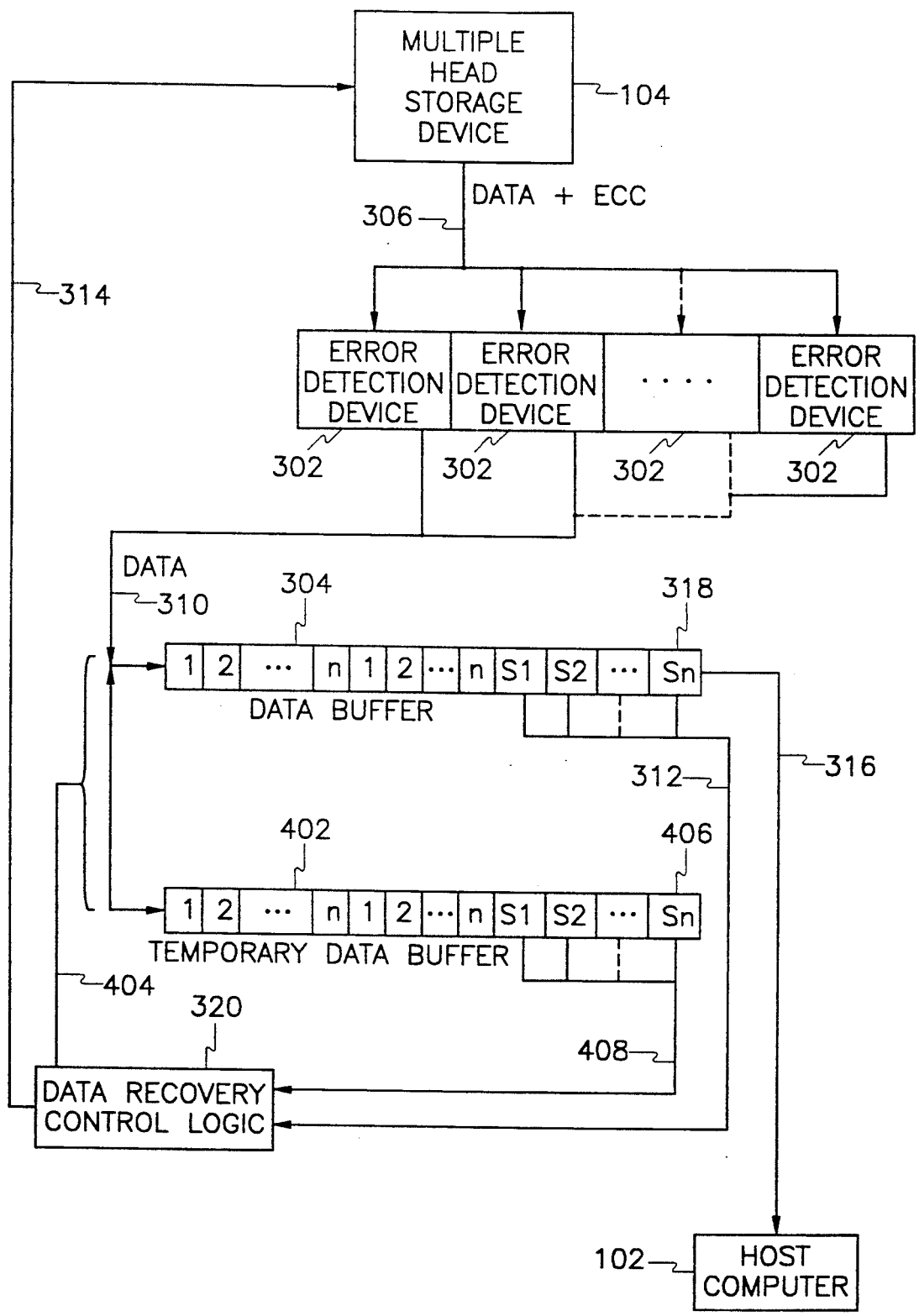
FIG. 5 is a block diagram of an embodiment of the present invention having separate error detection devices and an error control mechanism.

FIG. 5 shows another embodiment of the present invention. Referring now to FIG. 5, the status bits 318 and temporary status bits 406 are shown to be part of data buffer 304 and temporary data buffer 402, respectively This allows the status bits 318 and temporary status bits 406 to be set by status data generated by the error detection device(s) 302, and sent to the status bits 318 and temporary status bits 406 via data line 310. This status data is sent either to the status bits 318 or to temporary status bits 406 after a block of interleaved data is sent to either data buffer 304 or temporary data buffer 402, respectively. In effect, the data buffer 304 and temporary data buffer 402 are used to store the data from the multiple head storage device, as well as to store the status bits 318 and temporary status bits 406, respectively.

FIG. 5 also shows that the present invention contemplates the use of more than one error detection device 302. An error detection device 302 can be used for each head that exists in the multiple head storage device 104, or one error detection device 302 can be used for any number of heads. In any event, each error detection device 302 generates an error detection signal 308, which is detected by the appropriate status bits.

A. The Separate Error Detection Devices

An advantage to using more than one error detection device 302 is that it allows the burden of error detection to be split up among several different components. This is important when the multiple head storage device 104 is capable of sending data at very high speeds. Thus, using more than one error detection device 302 allows each of the error detection devices 302 to each operate at a fraction of the speed that a single error detection device 302 would be required to operate at if used by itself.

The actual speed at which each error detection device 302 would need to operate at where more than one error detection device 302 is used would depend upon the number of heads and the number of error detection devices 302 used. For example, if there are three heads in a multiple head storage device 104 and three error detection devices 302, each of the three error detection devices 302 would need to operate at one-third of the speed that a single error detection device 302 would operate at if used by itself. This allows for an easier and less expensive design of the error detection devices 302.

In order for more than one error detection device 302 to be used as shown in FIG. 5, an ECC needs to have been previously generated for each section of data that has been striped by, and written to, the multiple head storage device 104. In other words, each striped section of data written by each head of the multiple head storage device 104 needs to have its own ECC. One way of doing this as contemplated by the present invention is by striping the data prior to sending it to the multiple head storage device 104 into the same number and length of sections as the multiple head storage device 104 will do when the multiple head storage device 104 receives the data. Then, generate an ECC for each section of the data, interleave the data, and send it to the multiple head storage device 104 to be stored.

Figure 6:
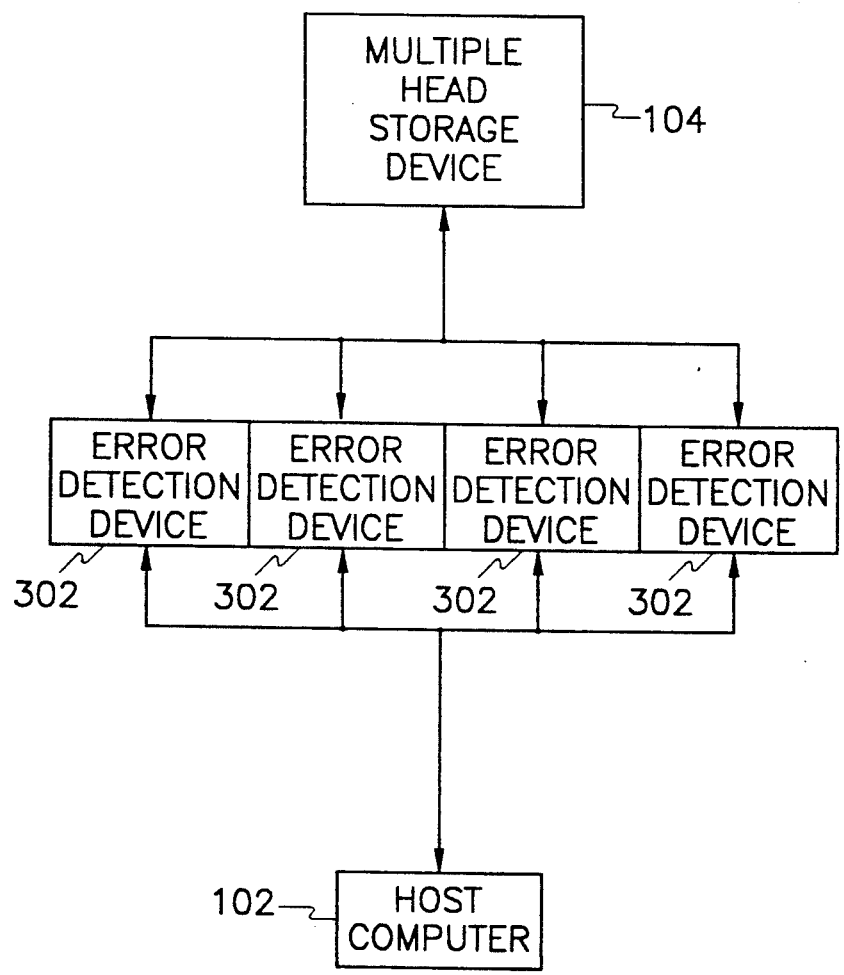
FIG. 6 is a block diagram of an embodiment of the present invention having separate error detection devices and showing the flow of data thereto.

When the data is read from the multiple head storage device 104, the same logic (for example, the same ECC algorithm) which generated the ECC can be used by the error detection devices 302 of the present invention in reverse to check the ECC and determine if any errors occurred. This two-way use of the same ECC logic is shown by FIG. 6. The logic chips used for generating and checking ECCs generally are readily available, and one typical example is from Simulex Corporation of Tustin, Calif.

B. Alternate Temporary Buffer Design

Figure 7:
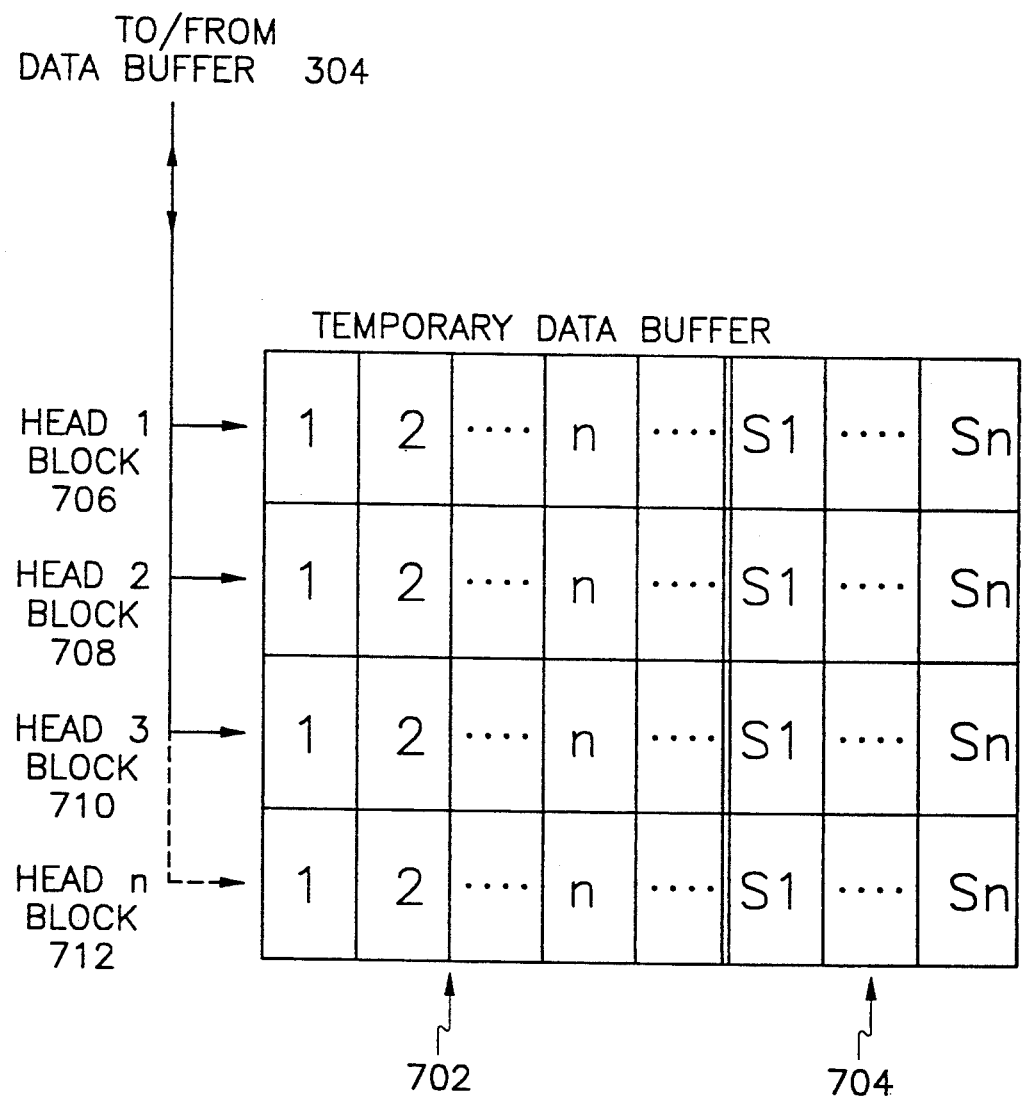
FIG. 7 is a block diagram of an alternate embodiment of the temporary data buffer.

FIG. 7 shows an alternative embodiment of the temporary data buffer 702 and corresponding status bits 704. This embodiment provides for a block of temporary data buffer space for each head used in the multiple head storage device 104. This allows for the recovery of data when more than one head is misaligned before any recovered data is interleaved back into data buffer 304.

The temporary data buffer of FIG. 7 is best explained by way of example. If heads 1 and 3 of the multiple head storage device 104 are both misaligned, the present invention might first recover the data from head 1 using the data recovery cycle explained above. Thus, head 1 would be moved by some small increment until head 1 block 706 contained decipherable data in the locations designated for that particular head (that is, those storage areas marked 1).

Once the data for misaligned head 1 is decipherable as indicated by the status bits corresponding to head 1 block 706, the present invention then begins the data recovery cycle to recover data from misaligned head 3 rather than immediately interleaving the data from head 1 block 706 with the data in the data buffer 304. Thus, the present invention will then send data to head 3 block 710 until the data for head 3 becomes decipherable. This is indicated by the temporary status bits 704 corresponding to head 3 block 710.

When the temporary status bits 704 indicate that the data read from both heads 1 and 3 is decipherable, only then is the data interleaved into the appropriate locations of the data buffer 304. Thus, using the temporary data buffer of FIG. 7 allows the present invention to perform all of the necessary data recovery at once, and then to perform all of the necessary interleaving into the data buffer 304 at once, when more than one head is misaligned.

The temporary data buffer 702 in FIG. 7 shows that each block for each head has space for all the data read in from all the heads, and that each of the corresponding status bits has a bit for each head. This was done so that each relevant portion of data would not have to be extracted. Thus, the data recovery control logic 320 only focusses in on that data and temporary status bits 704 that are relevant. In the above example, in head 1 block 706 only that data read from head 1 would be relevant, as would only corresponding status bit S1. Similarly, in head 3 block 710, only that data read from head 3 would be relevant, as would only corresponding status bit S3. This approach helps improve the speed of the overall invention. However, it should be understood that the present invention also contemplates a temporary data buffer 702 in which only relevant data is read in.

C. Specific Embodiments

Referring back to FIG. 5, in one embodiment of the present invention, the error detection devices are stored on CMOS. Further, the data buffer 304 and temporary data buffer 402 use 256 kilobytes of SRAM. Also, in one embodiment of the present invention, 2 bytes of data from each of the heads of the multiple head storage device 104 is read into the data buffer 304 at a time. Thus, each of the numbers shown in FIG. 5 representing a section of data written by one of the heads (that is, 1, 2, etc.) represents 2 bytes. Of course, any amount of data could be used for each section.

It should be noted that an embodiment of the present invention contemplates that there are two situations in which the existence of a "misaligned" head (that is, a head that produces undecipherable data) can be indicated. The first situation is described above, in which a head is not aligned with its target track. The second situation is when undecipherable data is read for reasons unrelated to the physical position of the head. These reasons include the existence of dust particles coming between the head and the target track.

In order to determine which situation has caused a head "misalignment" to be indicated, the data recovery logic 320 in one embodiment of the present invention first sends control signals to the multiple head storage device 104 to re-read the data from the head in which an error was detected This is done without incrementally moving the head. The error detection and buffering schemes indicated in the above-noted embodiments of the present invention would be used as indicated above during this re-read.

If this re-reading of data produces decipherable data, then the misaligned head is deemed to be an aligned head, and no additional data recovery is necessary. If it does not produce decipherable data, the data recovery control logic 320 then sends control signals to the multiple head storage device 104 to move the head by small increments, and the data recovery cycle outlined above would begin.

If neither the re-reading nor the movement of the head cause the head to become "aligned" in the sense that the data becomes decipherable, then in one embodiment of the present invention, the host computer is given an indication that a critical error has occurred.

IV. Operation of Invention

Figure 8:
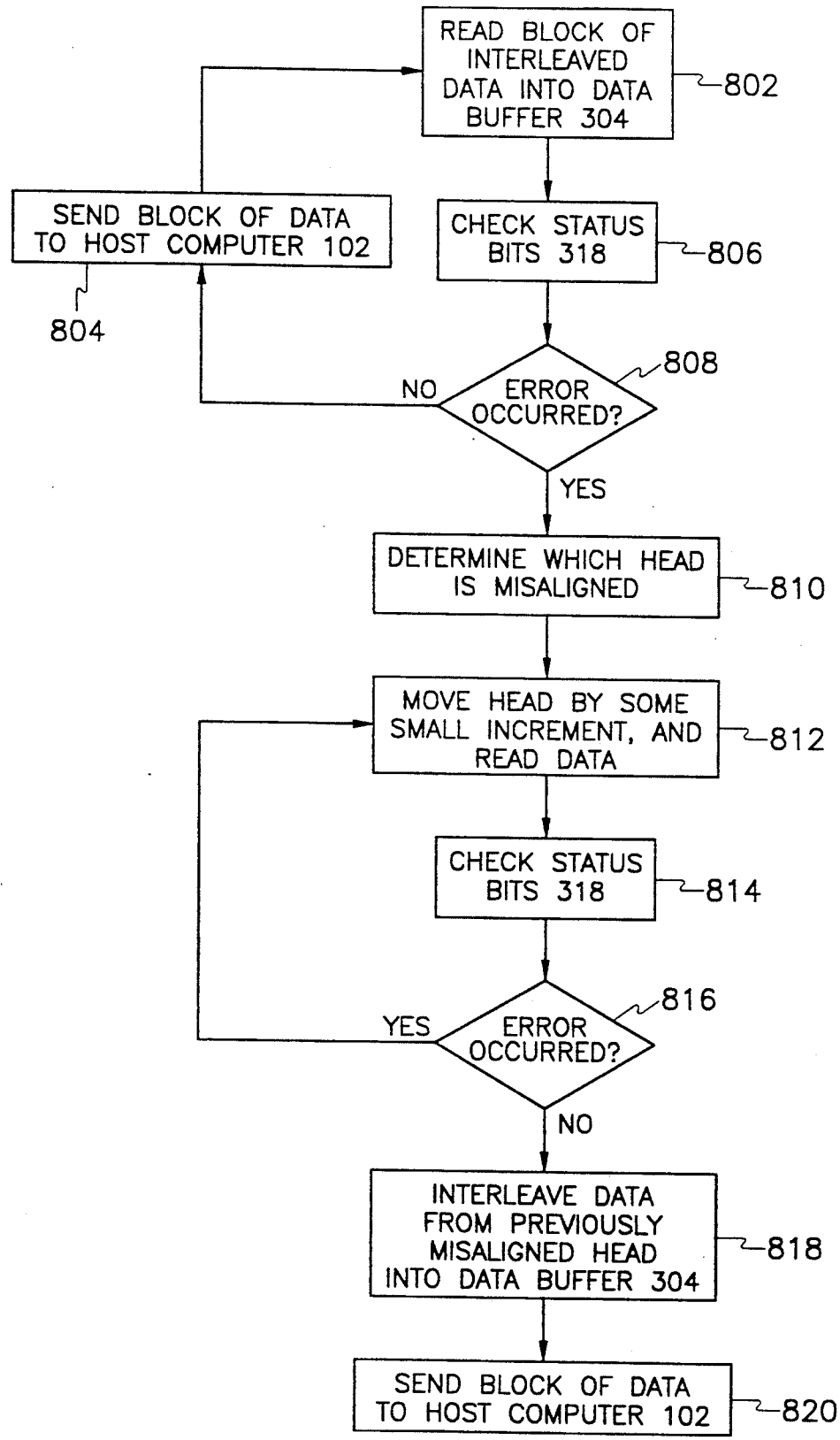
FIG. 8 is a flow diagram of the operation of an embodiment of the present invention.

FIG. 8 shows the operation of the present invention. First, a block of interleaved data is read into the data buffer 304, as indicated by a block 802. Then, the status bits 318 which indicate if an error has occurred in the data are checked, as indicated by a block 806. If no error has occurred, the block of interleaved data is sent to the host computer 102, as indicated by a decision block 808 and a block 804. Another block of interleaved data is then read into the data buffer 304 as indicated by block 802.

If an error has been found to occur as per decision block 808, then the next step is to determine which head is misaligned, as indicated by a block 810. Once this has been determined, the head which is misaligned is moved by some small increment (either by itself or in conjunction with any attached or affected heads of the multiple head storage device 104) and the data from the misaligned head is read as indicated by a block 812. This is accomplished without affecting decipherable data read from the remaining heads. The status bits 318 are then checked to see if the data contains any errors, as indicated by a block 814.

If there are still errors, then the misaligned head is again moved by some small increment, as indicated by a decision block 816, and block 812. If the status bits 318 indicate that the misaligned head has become an aligned head, the data from the now-aligned head is then interleaved into the block of interleaved data in the data buffer 304, as indicated by decision block 816 and a block 818. The block of interleaved data can then be sent on to the host computer, as indicated by block 820.

Figure 9:
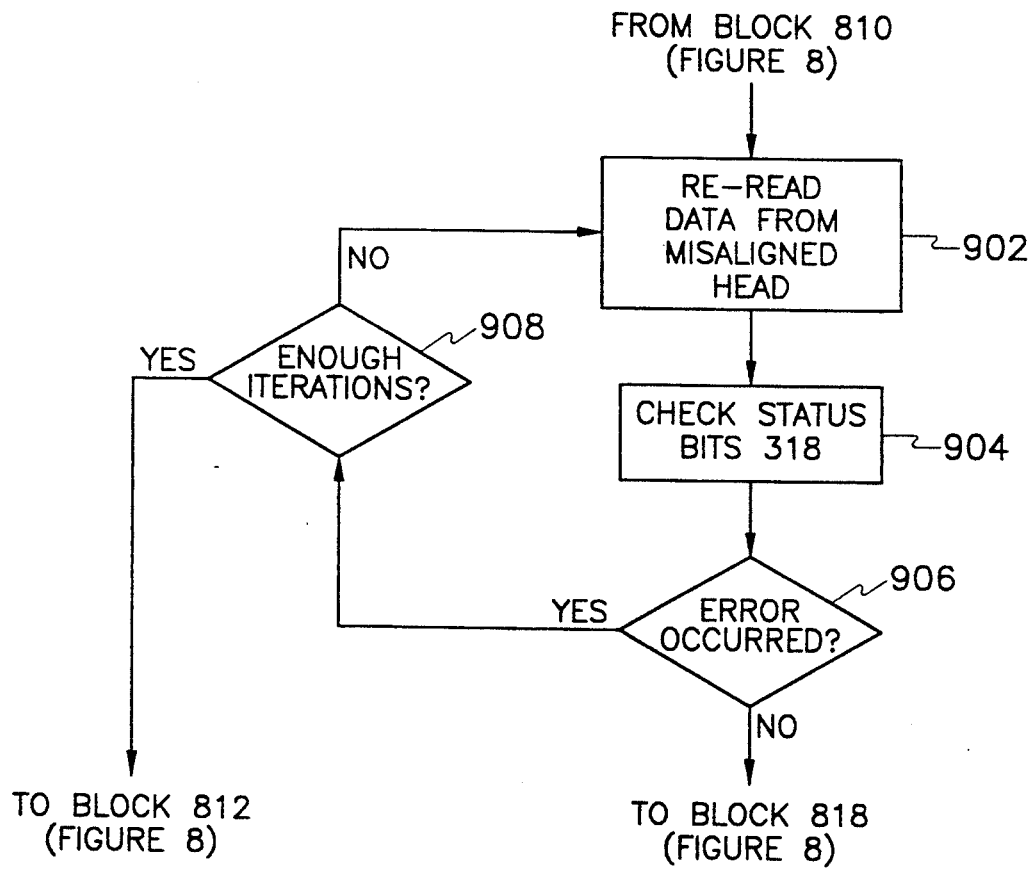
FIG. 9 is a flow diagram of the operation an embodiment of the present invention having re-read capabilities.

FIG. 9 shows the operation of the present invention having re-read capabilities. This embodiment contemplates the operation discussed above with regard to FIG. 8, and in addition, adds steps including the re-reading of data from a misaligned head as indicated by a block 902. This re-read is accomplished without moving the misaligned head.

After the data from the misaligned head is re-read, the status bits 318 are checked to see if the head is still misaligned, as indicated by a block 904. If no error has been found to occur which would indicate the existence of a misaligned head, as indicated by decision block 906, then the data is interleaved as per block 818 of FIG. 8. If, however, decision block 816 indicates that an error has occurred, then if the misaligned head has been re-read less than some set number of iterations, the misaligned head is re-read again, as indicated by a decision block 908 and block 902.

If the misaligned head has been re-read more than the set number of iterations, then when the present invention comes to the step indicated by decision block 908, the misaligned head will be moved by small increments, as indicated by block 812 of FIG. 8. Thus, in this embodiment, the operational steps shown in FIG. 9 could be inserted into FIG. 8.

It should be understood that the present invention can be implemented in a software embodiment. In such an embodiment, the various components and steps would be implemented in software to perform the functions of the present invention. Any presently available or future developed computer software language can be employed in such a software embodiment of the present invention.

It should further be understood that present invention is not limited to the embodiments indicated above, and that the examples presented above are merely for the purposes of illustration. The scope of the present invention should therefore be interpreted by the following claims as defined by the forgoing figures and text.

What is claimed is:

1. A system for aligning a misaligned head in a multiple head storage device having two or more heads capable of simultaneously reading data, comprising:

data buffer means for storing a block of interleaved data read from the multiple head storage device;

status bits for indicating which, if any, of the two or more heads is the misaligned head;

error detection means for determining from the block of interleaved data which if any of the two or more heads from the multiple head storage device is the misaligned head and for setting said status bits;

data recovery control logic means, responsive to said status bits, for sending control signals to the multiple head storage device, and for causing the misaligned head to move its position by small increments and to read data until said status bits indicate that the misaligned head has become an aligned head; and interleaving means, responsive to said status bits, for interleaving data read from the aligned head with said block of interleaved data in said data buffer means, such that any data stored in said data buffer means read from the misaligned head is overwritten by the data read from said aligned head.

2. The system of claim 1, wherein said data buffer means can store multiple blocks of interleaved data, and wherein each block has associated with it a corresponding set of said status bits.

3. The system of claim 1, wherein said error detection means comprises two or more error detection devices, wherein the block of interleaved data is striped evenly among said error detection devices.

4. The system of claim 1, wherein said error detection means comprises an error detection device for each head within the multiple head storage device.

5. The system of claim 1, wherein said status bits are part of said data buffer means.

6. The system of claim 1, wherein said data recovery control logic means further comprises reread means for sending control signals to the multiple head storage device to re-read data from the misaligned head, wherein said recovery control logic means sends additional control signals to the multiple head storage device to move the head by small increments only when said status bits indicate the existence of a misaligned head after the use of said re-read means.

7. The system of claim 1, wherein said data recovery control logic means further comprises means for sending control signals to the multiple head storage device to cause only one head in the multiple head storage device to move by small increments.

8. A system for aligning a misaligned head in a multiple head storage device having two or more heads capable of simultaneously reading data, comprising:

data buffer means for storing a block of interleaved data read from the multiple head storage device;

error detection means for determining from the block of interleaved data which if any of the two or more heads from the multiple head storage device is the misaligned head and for transmitting a first signal indicative of which if any of the two or more heads is misaligned;

status bit means, responsive to said first signal, and including status bits for indicating which of the two or more heads is the misaligned head;

temporary status bit means, responsive to said first signal, including temporary status bits for indicating whether said misaligned head has become an aligned head;

data recovery control logic means, responsive to said status bits and to said temporary status bits, for sending control signals to the multiple head storage device when said misaligned head is detected, causing the misaligned head to move its position by small increments and to read data from said misaligned head until said temporary status bits indicate that the misaligned head has become aligned;

temporary data buffer means for storing data read from said misaligned head after said control signals are sent to said multiple head storage device; and interleaving means, responsive to said temporary status bits, for interleaving data in said temporary data buffer means read from the newly aligned head with said block of interleaved data in said data buffer means, such that any data stored in said data buffer means read from the misaligned head is overwritten by the data read from said newly aligned head in said temporary data buffer means.

9. The system of claim 8, wherein said data buffer means can store multiple blocks of interleaved data, and wherein each block has associated with it a corresponding set of said status bits.

10. The system of claim 8, wherein said error detection means comprises two or more error detection devices, wherein said block of interleaved data is striped evenly among said error detection devices.

11. The system of claim 8, wherein said error detection means comprises an error detection device for each head within the multiple storage device.

12. The system of claim 8, wherein said status bits are part of said data buffer means.

13. The system of claim 8, wherein said data recovery control logic means further comprises re-read means for sending control signals to the multiple head storage device to re-read data from the misaligned head, wherein said recovery control logic means sends additional control signals to the multiple head storage device to move the head by small increments only when said temporary status bits indicate that the head is still misaligned after the use of said re-read means.

14. The system of claim 8, wherein said data recovery control logic means further comprises means for sending control signals to the multiple head storage device to cause only one head in the multiple head storage device to move by small increments.

15. The system of claim 8, wherein said temporary data buffer means can receive more than one block of interleaved data, and wherein said data recovery control logic means can detect that more than one misaligned head exists, and can recover data from each misaligned head prior to interleaving any data into said block of interleaved data in said data buffer means.

16. The system of claim 15, wherein said temporary status bits are part of said temporary data buffer means.

17. A method for aligning a misaligned head in a multiple head storage device having two or more heads capable of simultaneously reading data, comprising the steps of:

(1) reading a block of interleaved data from the multiple head storage device, and sending said block of interleaved data to a data buffer;

(2) detecting the existence of said misaligned head, and detecting from said block of interleaved data which head of the multiple head storage device is misaligned;

(3) generating error detection signals in response to said step (2) indicating which head is misaligned;

(4) setting status bits in response to said error detection signals of said step (3);

(5) sending control signals to the multiple head storage device in response to said status bits of said step (4) to move the misaligned head by some small increment and to read data from the misaligned head;

(6) repeating said steps (1)-(5) until said status bits indicate that the misaligned head has become an aligned head; and (7) interleaving data read from the aligned head with said block of interleaved data in said data buffer of said step (1) so that any data read by the misaligned head which was stored in said data buffer means is overwritten by data read from the aligned head.

18. The method of claim 17, wherein said step (1) comprises the step of receiving more than one block of interleaved data from the multiple head storage device.

19. The method of claim 17, further comprising a step (8) for re-writing said block of interleaved data to the multiple head storage device.

20. The method of claim 17, wherein said step (2) comprises the step of using two or more error detection devices, wherein said block of interleaved data is striped evenly among said error detection devices.

21. The method of claim 17, wherein said step (5) comprises the step of sending control signals to the multiple head storage device to re-read data from the misaligned head, and sending additional control signals to the multiple head storage device to move the head by small increments only when said status bits indicate that said misaligned head is still misaligned after sending said control signals to re-read data.

22. A method for aligning a misaligned head in a multiple head storage device having two or more heads capable of simultaneously reading data, comprising the steps of:

(1) reading a block of interleaved data from the multiple head storage device, and sending said block of interleaved data to a data buffer;

(2) detecting the existence of said misaligned head, and detecting from said block of interleaved data which head of the multiple head storage device is misaligned;

(3) generating error detection signals in response to said step (2) indicating which head is misaligned;

(4) setting status bits in response to said error detection signals of said step (3);

(5) sending control signals to the multiple head storage device in response to said status bits of said step (4) to move the misaligned head by some small increment and to read data from the misaligned head;

(6) directing data read from the misaligned head into a temporary data buffer;

(7) generating error detection signals in response to said step (5) indicating which head is misaligned;

(8) setting temporary status bits in response to said error detection signals of said step (7);

(9) repeating said steps (5)-(8) until said status bits indicate that the misaligned head has become an aligned head;

(10) interleaving data in said temporary data buffer of step (6) read from the aligned head with said block of interleaved data in said data buffer of said step (1) so that any data read from the misaligned head which was stored in said data buffer means is overwritten by data in said temporary data buffer read from the aligned head.

23. The method of claim 22, wherein said step (1) comprises the step of receiving more than one block of interleaved data from the multiple head storage device.

24. The method of claim 22, further comprising a step (11) for re-writing said block of interleaved data to the multiple head storage device.

25. The method of claim 22, wherein said step (2) comprises the step of using two or more error detection devices, wherein said block of interleaved data is striped evenly among said error detection devices.

26. The method of claim 22 wherein said step (5) comprises the step of sending control signals to the multiple head storage device to re-read data from the misaligned head, and sending additional control signals to the multiple head storage device to move the head by small increments only when said temporary status bits indicate that said misaligned head is still misaligned after sending said control signals to re-read data.

27. The method of claim 22 wherein said step (6) further comprises the step of receiving more than one block of interleaved data, and wherein said step (6) further comprises detecting the existence of more than one misaligned head, and recovering the data from each misaligned head prior to allowing said step (10) to interleave any data into said block of interleaved data in said data buffer.

28. A system for detecting a misaligned head in a multiple head storage device having n heads, comprising;

striping means for striping a block of interleaved data read from the multiple head storage device into at least two and at most n sections;

error detection means having at least one and at most n separate error detection devices having error checking logic for detecting a head misalignment, said error detection means capable of indicating which head in the multiple head storage device is misaligned;

interleaving means for interleaving the data from said error detection means, and for sending the block of interleaved data to a data recovery device.

29. The system of claim 28, wherein said error detection means contain a number of error detection devices equal to the number of heads in the multiple head storage device.

30. The system of claim 29, wherein said error checking logic used in said error detection means is used to generate an error correction code to be stored with the block of interleaved data when it is initially written to the multiple head storage device.

31. A method for detecting a misaligned head in a multiple head storage device having n heads, comprising the steps of;

(1) striping a block of interleaved data, read from the multiple head storage device, into at least two and at most n sections;

(2) detecting if any of said n heads is misaligned using at least one and at most n separate error detection devices having error detection logic for detecting errors in the data, said at least one and at most n error detection devices capable of indicating which head in the multiple head storage device is misaligned;

(3) interleaving the data received from said error detection means, and sending the interleaved data to a data recovery device.

32. The method of claim 31, wherein said step (2) comprises the step of using a number of error detection devices equal to the number of heads in the multiple head storage device.

33. The method of claim 31 wherein said step (2) comprises the step of using said error checking logic used in said error detection devices for generating error correction code to be stored with the block of interleaved data when it is initially written to the multiple head storage device.

* * * * *